United States Patent [19]

Tran

[11] Patent Number: 5,160,521
[45] Date of Patent: Nov. 3, 1992

[54] METHOD FOR MAKING OPTICAL FIBER PREFORMS

[76] Inventor: Danh C. Tran, 20 Royal Dominion Ct., Bethesda, Md. 20817

[21] Appl. No.: 718,705

[22] Filed: Jun. 21, 1991

[51] Int. Cl.$^5$ ............................................. C03C 25/02
[52] U.S. Cl. ...................................... 65/3.11; 65/41; 65/60.8; 65/130; 65/DIG. 15; 65/DIG. 16
[58] Field of Search ...................... 65/3.11, 3.12, 18.1, 65/18.2, 18.3, 41, 45, 60.8, DIG. 15, DIG. 16, 124, 129, 130

[56] References Cited

U.S. PATENT DOCUMENTS

| | | | |
|---|---|---|---|
| 3,880,634 | 4/1975 | Deeg et al. | 65/124 |
| 4,457,771 | 7/1984 | Ambrogi | 65/130 |
| 4,519,826 | 5/1985 | Tran | 65/DIG. 16 |
| 4,812,155 | 3/1989 | Kyoto et al. | 65/3.11 |
| 4,969,941 | 11/1990 | Kyoto et al. | 65/18.1 |

Primary Examiner—W. Gary Jones
Assistant Examiner—John J. Bruckner
Attorney, Agent, or Firm—Browdy & Neimark

[57] ABSTRACT

A method for fabricating defect-free optical fiber preforms without light scattering defects such as core-clad interface bubbles, core-clad crystalline inclusions and core glass crystals involves first forming a cladding glass shell preferably by rotational casting, then separately melting core glass inside a cylindrical crucible and quenching using metallic quenching blocks to prevent crystal formation in the core glass, next heating the core containing crucible to the core glass softening point and also heating the cladding tube containing mold to the glass transition temperature of the cladding glass, then placing the cladding tube containing mold inside the core glass crucible and pushing it downwardly with high pressure so that the softened core glass is forced into the cladding glass tube, and finally the preform is annealed to remove thermal stress. Subsequently, the preform is drawn into optical fibers using conventional technology.

11 Claims, 2 Drawing Sheets

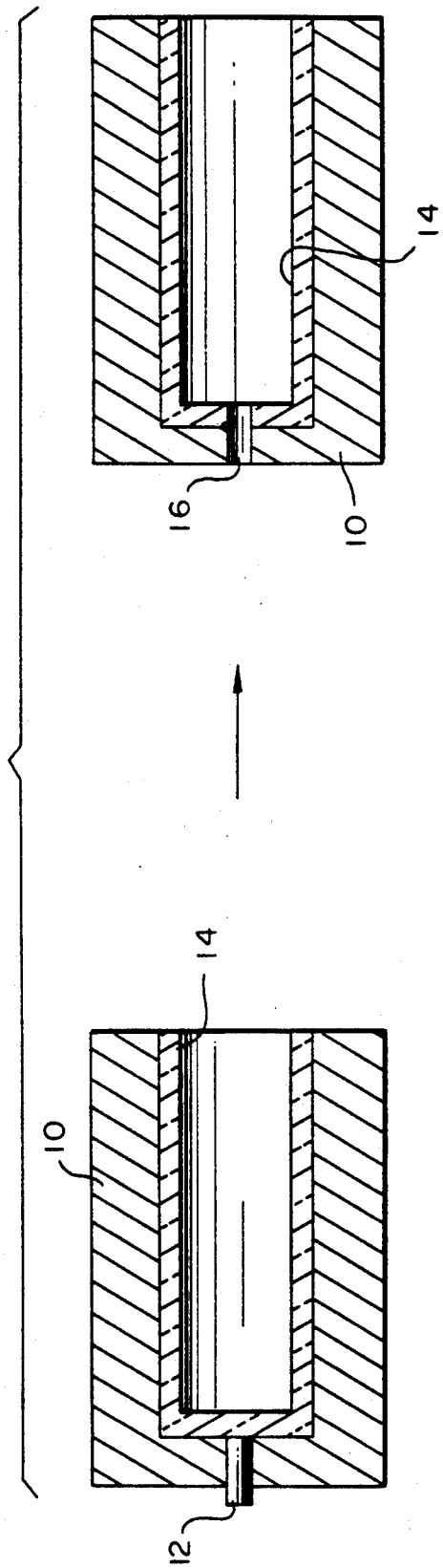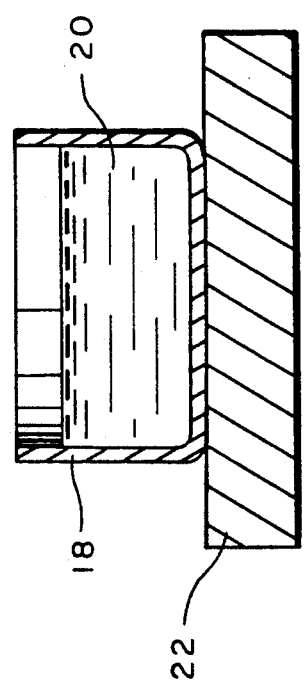

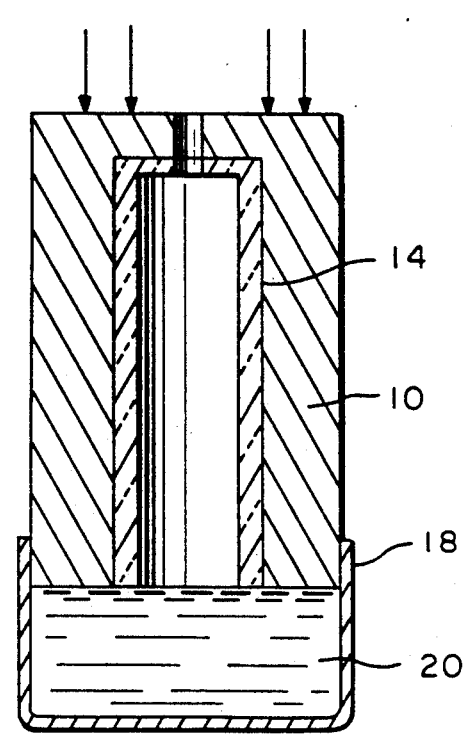
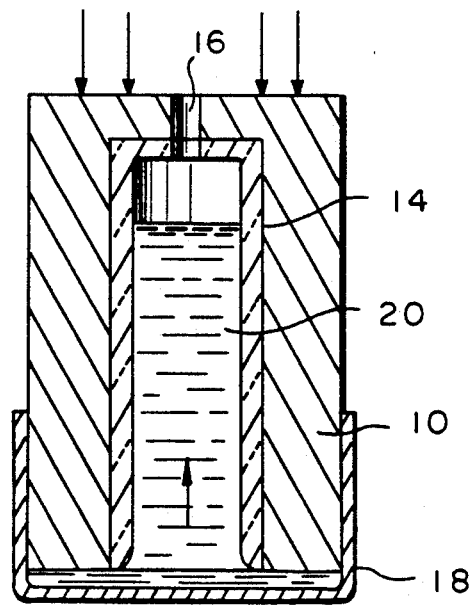
FIG. 3

METHOD FOR MAKING OPTICAL FIBER PREFORMS

FIELD OF INVENTION

The present invention relates to optical fibers. More specifically, it relates to a novel method for fabricating defect-free optical fiber preforms, especially of unstable glass compositions, whereby light scattering defects such as core-clad interface bubbles, core-clad crystalline inclusions and crystallization of the core glass are eliminated.

BACKGROUND

Fluoride glasses, which are non-oxide glasses, are usually based on heavy metal fluorides such as $ZrF_4$, $HfF_4$ or $BaF_2$, but also include glasses based on $AlF_3$ and $BeF_2$ as well as fluoro-phosphate-based glasses. Unlike oxide glasses, fluoride glasses have a relatively high tendency toward devitrification and must be quenched rapidly from the melt to avoid crystal formation.

There are several methods which can be used to fabricate high optical quality infrared transmitting fibers based on fluoride glasses. Examples are: U.S. Pat. No. 4,343,638; U.S. Pat. No. 4,659,355; U.S. Pat. No. 4,519,826; and co-pending U.S. patent application Ser. No. 07/498,453. Glass-clad fluoride optical fibers are normally prepared by preform drawing, the fluoride glass preforms being fabricated either by rotational casting or built-in casting. Thus, molten fluoride cladding glass is cast inside a metallic mold pre-heated to the glass transition temperature ($T_g$) and the mold is rotated and cooled so that the melt solidifies into a concentric and uniform tube or shell adjacent the internal wall of the cylindrical mold. Finally, the molten core glass which has a higher refractive index than the cladding glass is poured into the tube to form a fluoride glass preform which is subsequently drawn into fibers in a resistance or RF induction furnace.

The aforementioned Tran U.S. Pat. No. 4,519,826 discloses that the core melt may be introduced into the rotationally cast cladding using either suction or positive pressure. It is stated that the cladding shell or tube is introduced into the melt of the core glass and then sufficient pressure is applied to the core melt surrounding the inserted end to force the core melt into the cladding tube. However, this operation is carried out at the melting temperature which causes a degree of sublimation with condensates which are deposited on the inner wall of the cladding tube. These condensates represent nucleation sites which induce crystallization, especially in the case of unstable fluoride glasses.

The built-casting method is somewhat similar, except that the cladding tube is prepared by casting the cladding glass melt inside a metallic mold and subsequently upsetting the mold to allow the still molten glass to flow out of the mold, after which the core melt is then introduced into the tube as already described above. Another technique for fabricating polymer clad fluoride fiber consists of casting of the melt inside a metallic mold to form a solid fluoride glass rod, after which the rod is drawn into a fiber which is coated in line with a low refractive index polymer which acts as an optical cladding.

However, all techniques used to date to make glass clad fluoride glass preforms apply only to very stable glass compositions. For unstable compositions, undesirable crystal formation will be induced in the core during the casting of the core melt inside the cladding tube. Bubbles in the core, formed by trapped gas which originates from turbulence when the core melt is poured into the tube, represent an additional source of scattering defects.

Chalcogenide optical fibers, like fluoride glass fibers, are useful as infrared fibers such as for the power delivery of high intensity $CO_2$ and CO lasers, but the chalcogenide glasses are also relatively unstable against crystallization. There is only one technique at present which can be used to make glass-clad chalcogenide optical fibers, such technique being based on crucible drawing of preforms as described in the paper entitled "Chalcogenide Glass Fibers for Power Delivery of $CO_2$ Laser" by T. Nishii et al, pages 224–232, SPIE Vol. 1228 Infrared Fiber Optics II (1990).

However, there are two draw-backs to the crucible drawing approach: first, chalcogenide glasses which are based on Ge, As, Se, Sb and Te sublime at the drawing temperature ($T_{draw}$) which is about 30° C. to 45° C. higher than the softening temperature ($T_s$) of the glass, it being understood that sublimation is minimal at $T_s$. In the crucible draw technique, the processing temperature has had to be kept relatively high, i.e. at $T_{draw}$, thus inducing the formation of undesirable trapped bubbles at the core-clad interface due to sublimation. Furthermore, attempts to apply a vacuum in the spacing between the core rod and the cladding tube made sublimation even worse.

Second, the crucible drawing approach requires a core rod having an optically polished surface. During the polishing step, the rod surface is likely to become contaminated with oxide impurities. These impurities then become scattering defects at the core-clad interface of the preform.

SUMMARY OF THE INVENTION

It is, accordingly, an object of the invention to overcome deficiencies in the prior art, such as those indicated above.

It is another object to provide improved optical fibers which are substantially defect-free, and especially high optical quality infrared transmitting fibers.

It is yet a further object to provide improved core-clad optical fibers based on fluoride or chalcogenide glasses.

It is a further object of the present invention to provide an improved method for fabricating optical fiber preforms which are free of light scattering defects such as core-clad interface bubbles, core-clad crystalline inclusions and core crystals.

These and other objects are achieved by a process involving a series of interrelated steps including forming the cladding shell for the preform, quenching the core glass melt in such a way as to prevent crystal formation in the core glass and provide a viscous glass mass at approximately its glass softening point $T_s$ and preferably at its $T_s$, heating the cladding tube to about its glass transition temperature $T_g$, and forcing the cladding tube into the soft core glass mass at high pressure to force the viscous core glass to fill the cladding glass tube.

BRIEF DESCRIPTION OF DRAWING

The above and other objects and the nature and advantages of the present invention will be more apparent from the following detailed description of certain embodiments, taken in conjunction withe the drawing wherein:

Fig. 1 is a schematic cross-sectional view of two steps of a preferred process embodiment according to the present invention for formation of the cladding tube;

FIG. 2 schematically illustrates the rapid quenching of the core melt; and

FIG. 3 schematically illustrates the pressurizing process by which the viscous core mass at $T_s$ is forced within the cladding tube by pressure.

DETAILED DESCRIPTION OF EMBODIMENTS

In general, the process of the present invention in its preferred embodiment as applied to fluoride glasses is carried out as a series of six steps. Because of the aforementioned difficulties in the handling and fabrication of fluoride and chalcogenide glasses, the present process is carried out in a dry box containing an inert gas, preferably nitrogen or argon.

With reference to Fig. 1, the selected cladding glass melt is deposited in a mold 10 having a cylindrical cavity and an end plug 12 extending through its closed end wall. The preferably cylindrical mold 10 is then rotated while the glass melt is cooled or quenched to about its glass transition temperature ($T_g$) to obtain a uniform cladding glass tube 14 as illustrated in FIG. 1. The end plug 12 is then removed and an opening is poked through the closed end of the cladding tube 14 with a hot poker, e.g. the hot tip of a soldering gun, to provide a vent hole 16. It will be understood that other means can be used to provide the vent hole 16, e.g. the interior end of the end plug 12 can be appropriately shaped and extended into the interior of the cavity of the mold 10 so that upon the withdrawal of the end plug 12 the vent hole is already provided, or so there is only an extremely thin layer of cladding glass through which the vent hole 16 is poked.

While methods other than the aforedescribed rotational casting method of forming the cladding tube 14 can be used, the conventional rotational casting process—except for deviations mentioned above—is preferred because it is effective to efficiently obtain a suitable cladding tube 14 of uniform thickness, and also because the mold 10 itself is subsequently used in the process as will be pointed out below.

In a second operation, melting of a core glass—having a higher refractive index than the cladding glass—is effected within a suitable crucible 18, desirably formed of platinum, having an interior cavity complimentary in shape to the exterior of the mold 10, these complimentary shapes preferably being cylindrical, and wherein the exterior of the mold 10 closely conforms to the interior diameter of the crucible 18. The core glass melt 20 is then solidified in situ inside the crucible using suitable quenching means, e.g. metallic blocks 22, to rapidly conduct the heat away from the melt to prevent crystal formation in the core glass (see FIG. 2), as disclosed in co-pending application Ser. No. 07/468,300.

In a third operation, the core glass containing crucible 18 is reheated to about its core glass softening point ($T_s$) or slightly greater, e.g. up to about 15° C. plus, and the cladding tube 14 and its containing mold 10 are heated to the glass transition temperature ($T_g$) ±15° C. of the cladding glass to prevent its cracking during a later stage of the process, it being understood that the core glass $T_s$ is greater than the cladding glass $T_g$. The reheating of the core glass can be avoided if the quenching step of the second operation is carefully controlled so as to bring the core glass temperature down only to or close to its $T_s$.

In a fourth operation, the cladding tube 14 and its containing mold 10 are placed inside the core glass crucible 18 as shown in FIG. 3, and the mold 10 and cladding tube 14 are pushed downwardly, under high pressure, to force the high viscosity softened core glass 20 at about $T_s$ to fill the cladding glass tube 14. The gas within the cladding tube 14 is displaced by the core glass 20 and escapes through the vent hole 16.

In a fifth operation, the so-formed preform is annealed using conventional technology to remove thermal stress.

In a sixth operation, the so-formed and annealed preform is drawn into optical fibers using known technology. This drawing step presents no problem in the case of chalcogenide preforms even though some sublimation will occur from the outside of the sheathing shell, because the fourth step results in complete uniting of the sheath and core so that no sublimation occurs at the interface during the drawing.

The present invention provides a number of advantages regarding both fluoride and chalcogenide glasses.

As described in Tran U.S. Ser. No. 07/468,300 entitled "In-situ Quenched Fluoride Glasses", a fluoride glass melt easily crystallizes if it is disturbed during the quenching process. The degree of crystallization increases as the glass composition stability decreases. Fluoride glass has a very low viscosity, approaching that of water, i.e. only a few centipoises, at its melt temperature. In the prior art methods of making a fluoride glass preform, the low viscosity core melt is always disturbed when introduced into the cladding tube which inevitably causes some crystals to form. In the present pressure method, the core melt is in-situ quenched without disturbance as described in patent application Ser. No. 07/468,300, whereby the core glass thus obtained is completely free of crystalline defects. When reheated to the softening point in the third step above, the core glass does not crystallize because of the high viscosity of the glass, whereas crystallization is a serious problem when working with this type of glass at or above its melting temperature. The preforms obtained using the present invention have no core crystals.

The sublimation of chalcogenide glasses mentioned above is eliminated when making chalcogenide fibers according to the present method because the preform can be prepared at the onset of the softening point of the core glass by exerting high pressure to fill the cladding tube. Furthermore, polishing is not required, and the chalcogenide cladding glass tube and core glass are kept inside the dry box, thus preventing oxide contamination.

The following examples further serve to better particularly point out the invention, but it is to be understood that these examples are only offered illustratively and not by way of limitation:

COMPARATIVE EXAMPLE 1 AND EXAMPLE 1

These examples demonstrate the advantage of using the pressure method to make preforms from unstable fluoride glass composition:

AlF$_3$-based glasses are excellent candidate materials for infrared fibers because of their high optical transparency from the UV (0.3 micron) to the mid-IR (4 microns) wavelength region and because of their excellent chemical durability. One drawback as noted above is the substantial instability of these AlF$_3$-based glass compositions, namely these glasses exhibit crystalline defects when cast into molds from their low viscosity melts, and this drawback has previously inhibited their utility.

An Ar dry box containing less than 0.5 ppm water was used. 15 g of an AlF$_3$-based cladding glass whose composition in mol % is 30AlF$_3$-10ZrF$_4$-8AlF$_3$-4MgF$_2$-20CaF$_2$-13SrF$_2$-11BaF$_2$-4NaF was melted at 900° C. for one hour in a Pt crucible, refined at 850° C. for thirty minutes, then cast into a brass mold which was preheated at 375° C., the cladding glass transition temperature (T$_g$). The mold was immediately rotated at 3,000 rpm to form a cladding glass tube in a fashion described in co-pending U.S. patent application Ser. No. 498,453. An AlF$_3$-based core glass whose composition in mol % is 30AlF$_3$-10ZrF$_4$-7AlF$_3$-4MgF$_2$-18CaF$_2$-12SrF$_2$-10BaF$_2$-4NaF-5PbF$_2$ was melted the same way as the cladding glass. The core melt was then cast at 850° C. into the cladding tube within the brass mold preheated at the core glass T$_g$ of 370° C. The core melt solidified to give a preform. The brass mold containing the preform was annealed at T$_g$ of 370° C. for one hour and cooled to room temperature.

The resultant preform was 8 cm long, 10.2 mm in diameter and had a 1 mm cladding thickness. Examination of the preform using a polarized light microscope revealed 35 crystals in the core with size ranging from 10 microns to 30 microns. There were no crystals in the cladding because the cladding melt quenched very rapidly on contact with the metal and thus crystallization did not occur.

A second cladding tube was prepared as above. A vent hole was poked at the closed end of the tube. The core melt was not cast this time in the cladding tube, but was instead in-situ quenched inside the Pt-crucible placed on a brass plate pre-heated to the core glass T$_g$ of 370° C. on a hot plate. When the core glass solidified, the brass mold containing the cladding tube pre-heated at the cladding glass T$_g$ of 375° C. was placed on top of the core glass, inside the Pt crucible, its opening facing toward the core glass. Fifteen pounds of weight were placed on top of the brass mold, and the temperature of the hot plate was increased from 370° C. to 415° C., the softening temperature (T$_s$) of the core glass. The core glass softened to a viscous mass and rose into the cladding tube as the cladding tube sank into the core glass to give a preform.

The preform was annealed as above. The preform revealed no crystals when characterized with a polarized light microscope.

EXAMPLE 2

The following chalcogenide glass compositions in atom % were used to make the glass preform: Ge$_{25}$As$_{20}$Se$_{25}$Te$_{30}$ for core and Ge$_{20}$As$_{30}$Se$_{30}$Te$_{20}$ for clad. The starting materials were weighed (25 g for clad, 35 g for core) in a dry Ar glove box and each sealed in a cylindrical silica crucible, i.e. a silica ampoule, under vacuum of $5 \times 10^{-7}$ Torr. The ampoules were heated in a rocking furnace at 900° C. for twenty-four hours to melt. The ampoule containing the core melt was quenched in air in a vertical position; the ampoule containing the cladding melt was rotated in air to form a cladding tube.

Upon cooling the ampoules were transferred to the glove box. Both ends of the ampoule containing the cladding tube were cut to expose the cladding tube ends. One end of the ampoule containing the core glass was cut to expose the core glass. The core glass ampoule was placed inside an electric furnace at the core glass T$_g$ of 245° C. The cladding glass ampoule was preheated to the cladding glass T$_g$ of 236° C. in a separate furnace. The temperature of the core glass ampoule was subsequently increased to 270° C. which is the softening temperature of the core glass and the cladding glass ampoule was inserted inside the core glass ampoule. Fifteen pounds of weight were placed on top of the cladding tube ampoule. The core glass sank into the cladding glass tube to give a preform.

When examined under an infrared microscope, there were no bubbles and crystals forming the core-clad interface.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. For example, a wide variety of fluoride glasses and chalcogenide glasses can be used to produce defect-free optical fibers in accordance with the present invention. It is to be understood that the phraseology or terminology employed herein is for the purpose of description and not of limitation.

What is claimed is:

1. A method of making an optical fiber preform convertible into optical fiber, comprising:
   forming a cladding shell of a first glass;
   forming a viscous glass mass of a second glass compatible as a waveguide core with said first glass and having an index of refraction greater than said first glass, said viscous glass mass of said second glass being at approximately its glass softening temperature;
   providing said cladding shell at about its glass transition temperature;
   forcing said viscous glass mass of said glass under pressure arid at approximately its glass softening temperature into said cladding shell at about its glass transition temperature and cooling to form a preform substantially free of bubbles, crystalline inclusions and core crystals.

2. A method according to claim 1 wherein said first and second glasses are selected from the group consisting of fluoride glasses and chalcogenide glasses.

3. A method according to claim 1 wherein said cladding shell is provided by casting a melt of said first glass in a mold maintained at approximately the glass transition temperature of said first glass, and forming said shell by rotational casting.

4. A method according to claim 3 further comprising forming a vent hole at a closed end of said cladding shell.

5. A method according to claim 1 wherein said second glass is a fluoride glass, comprising forming said second glass melt in a crucible and rapidly quenching said melt to approximately its glass softening temperature to prevent crystal formation.

6. A method according to claim 1 wherein said second glass is a fluoride glass, comprising forming said second glass melt in a crucible, rapidly quenching said second glass melt using at least one quenching block to rapidly conduct heat away from said melt to prevent crystal formation, and reheating the quenched glass to about its softening temperature.

7. A method according to claim 1 wherein immediately prior to said forcing of said viscous glass mass of said second glass into said cladding shell, said cladding shell is heated to about its glass transition temperature.

8. A method in accordance with claim 7 wherein said viscous glass mass of said second glass is in a substantially cylindrical crucible and said cladding shell is in a substantially cylindrical mold, the external diameter of said mold corresponding to the internal diameter of said crucible, and wherein said viscous glass mass of said second glass is forced into said cladding shell by pushing the cladding shell containing mold inside said crucible downwardly with high pressure.

9. A method according to claim 1 further comprising annealing said preform.

10. A method of making an optical fiber preform convertible into optical fiber comprising:
 forming a cladding shell of a first glass selected from the group consisting of fluoride glasses and chalcogenide glasses;
 forming a viscous glass mass of a second glass compatible as a waveguide core with said first glass and having an index of refraction greater than said first glass, said second glass being selected from the group consisting of fluoride glasses and chalcogenide glasses, said viscous glass mass of said second glass being at approximately its glass softening temperature;
 heating said cladding shell to about its glass transition temperature;
 forcing said viscous glass mass of said second glass under pressure and at approximately its glass softening temperature into said cladding shell;
 cooling to form a preform substantially free of bubbles, crystalline inclusions and core crystals; and
 annealing said preform.

11. A method of making an optical fiber, comprising:
 forming a cladding shell of a first glass;
 forming a viscous glass mass of a second glass compatible as a waveguide core with said first glass and having an index of refraction greater than said first glass, said viscous glass mass of said second glass being at approximately its glass softening temperature;
 heating said cladding shell to about its glass transition temperature;
 forcing said viscous glass mass of said second glass under pressure and at approximately its glass softening temperature into said cladding shell and cooling to form a preform substantially free of bubbles, crystalline inclusions and core crystals; and
 drawing said preform into an optical fiber.

* * * * *